(12) United States Patent
Ma et al.

(10) Patent No.: US 12,711,531 B2
(45) Date of Patent: Aug. 18, 2026

(54) INFORMATION RECOMMENDATION METHOD, APPARATUS, AND NON-TRANSITORY COMPUTER READABLE MEDIUM

(71) Applicant: Beijing Wodong Tianjun Information Technology Co., Ltd., Beijing (CN)

(72) Inventors: Kui Ma, Beijing (CN); Yong Li, Beijing (CN); Changping Peng, Beijing (CN)

(73) Assignee: Beijing Wodong Tianjun Information Technology Co., Ltd., Beijing (CN)

( * ) Notice: Subject to any disclaimer, the term of this patent is extended or adjusted under 35 U.S.C. 154(b) by 443 days.

(21) Appl. No.: 18/246,253

(22) PCT Filed: Jun. 24, 2021

(86) PCT No.: PCT/CN2021/101967

§ 371 (c)(1),
(2) Date: Mar. 22, 2023

(87) PCT Pub. No.: WO2022/062507

PCT Pub. Date: Mar. 31, 2022

(65) Prior Publication Data

US 2023/0360105 A1 Nov. 9, 2023

(30) Foreign Application Priority Data

Sep. 23, 2020 (CN) ........................ 202011009804.X

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0641* (2013.01)

(58) Field of Classification Search
CPC ........... G06Q 30/0631; G06Q 30/0641; G06Q 30/06311; G06Q 30/06312;
(Continued)

(56) References Cited

U.S. PATENT DOCUMENTS 9,904,949 B1 * 2/2018 Tavernier ........... G06Q 30/0631
10,437,902 B1 * 10/2019 Jain ..................... G06F 16/9535
(Continued)

FOREIGN PATENT DOCUMENTS

CN 102591995 A 7/2012
CN 105224657 A 1/2016
(Continued)

OTHER PUBLICATIONS

T. Robal and A. Kalja, "Learning from users for a better and personalized web experience," 2012 Proceedings of PICMET '12: Technology Management for Emerging Technologies, Vancouver, BC, Canada, 2012, pp. 2179-2188. (Year: 2012).*
(Continued)

*Primary Examiner* — Arielle E Weiner
(74) *Attorney, Agent, or Firm* — Dinsmore & Shohl LLP

(57) ABSTRACT

A method and apparatus for recommending information are provided. The method includes: acquiring, in response to determining that a user enters a preset interface based on a first preset operation of the user, operation information within a preset length of time before the user performs the first preset operation; determining behavior data of the user browsing the preset interface based on the operation information; and determining recommendation information for the user based on the behavior data, and displaying the recommendation information in the preset interface.

13 Claims, 5 Drawing Sheets

(58) Field of Classification Search
CPC ....... G06Q 30/06313; G06Q 30/06314; G06Q 30/06315; G06Q 30/0643; G06Q 30/06431; G06Q 30/06432; G06Q 30/06433; G06Q 30/06434; G06Q 30/06435; G06Q 30/0644; G06Q 30/06442; G06Q 30/06444
See application file for complete search history.

(56) References Cited

U.S. PATENT DOCUMENTS

| | | | | |
|---|---|---|---|---|
| 10,706,450 | B1 * | 7/2020 | Tavernier | G06Q 30/0641 |
| 10,866,976 | B1 * | 12/2020 | Yoon | G06F 16/288 |
| 11,392,751 | B1 * | 7/2022 | Szarvas | G06F 40/106 |
| 2009/0163183 | A1 | 6/2009 | O'Donoghue et al. | |
| 2012/0316960 | A1 * | 12/2012 | Yang | G06Q 30/0282 705/14.53 |
| 2019/0005409 | A1 * | 1/2019 | Doshi | G06Q 30/0631 |
| 2019/0197416 | A1 | 6/2019 | Yao et al. | |
| 2021/0358007 | A1 * | 11/2021 | Zhang | G06Q 30/0631 |

FOREIGN PATENT DOCUMENTS

| | | | |
|---|---|---|---|
| CN | 105739843 | A | 7/2016 |
| CN | 106484760 | A | 3/2017 |
| CN | 106919597 | A | 7/2017 |
| CN | 107273436 | A | 10/2017 |
| CN | 107577821 | A | 1/2018 |
| CN | 108243357 | A | 7/2018 |
| CN | 108399232 | A | 8/2018 |
| CN | 108763502 | A | 11/2018 |
| CN | 109298810 | A | 2/2019 |
| CN | 109815368 | A | 5/2019 |
| CN | 110232155 | A | 9/2019 |
| CN | 110287421 | A | 9/2019 |
| CN | 110322305 | A | 10/2019 |
| CN | 110598098 | A | 12/2019 |
| CN | 110971659 | A | 4/2020 |
| CN | 111414532 | A | 7/2020 |
| CN | 107230098 | A | 10/2023 |
| EP | 3506184 | A1 | 7/2019 |
| EP | 3634004 | A1 | 4/2020 |

OTHER PUBLICATIONS

Zhang et al., "Application of XGBoost Algorithm in Ecommerce Commodity Recommendation," Intelligent Processing and Application, pp. 2095-1302, 2017, 9 pages.

Liu et al., "Fusion of personalized recommendation model based on user's interest drifting," Computer Engineering and Design, Aug. 2013, vol. 34, No. 8, 7 pages.

Ding, The Research of Personalized Recommendation Based on Web Mining—A Thesis Submitted in Partial Fulfillment of the Requirements for the Degree of the Master of Engineering, Huazhong University of Science and Technology, Apr. 2004, 63 pages.

International Search Report from PCT/CN2021/101967 mailed Sep. 27, 2021, 4 pages.

* cited by examiner

INFORMATION RECOMMENDATION METHOD, APPARATUS, AND NON-TRANSITORY COMPUTER READABLE MEDIUM

The present application is a national stage of International Application No. PCT/CN2021/101967, filed on Jun. 24, 2021, which claims the priority of Chinese Patent Application No. 202011009804.X, titled "INFORMATION RECOMMENDATION METHOD AND DEVICE", filed on Sep. 23, 2020. Both of the aforementioned applications are hereby incorporated by reference in their respective entireties.

TECHNICAL FIELD

Embodiments of the present disclosure relate to the field of computer technologies, and in particular, to a method and apparatus for recommending information.

BACKGROUND

With the rapid development of mobile Internet, shopping applications emerge one after another, and user traffic is an important content in competition among companies. In the field of e-commerce, user stickiness may be improved from a dimension of display positions of goods. Specifically, in shopping applications, goods recommendation of different types in a homepage information flow and similar goods recommendation in a goods details interface have gradually become standard configurations. In The homepage information flow scenario, it aims to capture a user's point of interest. The more accurately the goods that the user is interested in is determined, the more the user's browsing time and scrolling depth can be increased. A display of similar goods in the goods details interface is intended to display goods of the same category as the current goods and provide the user with more choices. The more accurately the brand or goods model that the user is interested in is displayed, the easier it is for the user to compare goods of the same type, and a conversion ratio of goods may be increased. At present, the information flow scenario and the recommendation scenario of the goods details interface are completely independent and there is no connection between the two.

SUMMARY

Embodiments of the present disclosure propose a method and apparatus for recommending information.

Some embodiments of the present disclosure provide a method for recommending information, including: acquiring, in response to determining that a user enters a preset interface based on a first preset operation of the user, operation information within a preset length of time before the user performs the first preset operation; determining behavior data of the user browsing the preset interface based on the operation information; and determining recommendation information for the user based on the behavior data, and displaying the recommendation information in the preset interface, wherein objects represented by the recommendation information comprise objects of a same category as a main object displayed in the preset interface, and objects of different categories from the main object.

In some embodiments, the behavior data comprises first behavior data representing that the user has a definite browsing object and second behavior data representing that the user has no definite browsing object; and the determining behavior data of the user browsing the preset interface based on the operation information, comprises: inputting, in response to determining that the operation information comprises a second preset operation, the operation information into a pre-trained behavior data recognition model to obtain a first array representing a first proportion of the first behavior data and a second proportion of the second behavior data.

In some embodiments, the determining behavior data of the user browsing the preset interface based on the operation information, further comprises: determining, in response to determining that the operation information does not comprise the second preset operation, a portal to enter the preset interface; and determining, in response to determining that the portal is a portal in an interface obtained based on a third preset operation of the user, a second preset array representing the first proportion of the first behavior data and the second proportion of the second behavior data.

In some embodiments, the determining behavior data of the user browsing the preset interface based on the operation information, further comprises: determining, in response to determining that the portal is a portal in a preset recommendation interface, a third preset array representing the first proportion of the first behavior data and the second proportion of the second behavior data.

In some embodiments, the determining recommendation information for the user based on the behavior data, comprises: determining the objects of the same category as the main object, based on the first proportion of the first behavior data and preset display area information in the preset interface; and determining the objects of different categories from the main object, based on the second proportion of the second behavior data and the preset display area information.

In some embodiments, the behavior data recognition model is obtained by training through a following method: acquiring a training sample set, wherein training samples in the training sample set comprise: sample operation information with a unit of the preset length of time and sample labels; and training, using a machine learning algorithm, using the sample operation information in the training samples as input of an initial behavior data recognition model, and using the sample labels corresponding to the input sample operation information as expected output of an initial behavior data recognition model, to obtain the behavior data recognition model.

In some embodiments, the acquiring a training sample set, comprises: acquiring log information; dividing the log information according to a unit of the preset length of time to obtain a plurality of pieces of sample operation information; and determining, for each piece of sample operation information in the plurality of pieces of sample operation information, based on a number of object categories comprised in the sample operation information, and a number of page views for each category in the sample operation information, a sample label for the sample operation information.

Some embodiments of the present disclosure provide an apparatus for recommending information, including: a first acquiring unit, configure to acquire, in response to determining that a user enters a preset interface based on a first preset operation of the user, operation information within a preset length of time before the user performs the first preset operation; a first determining unit, configured to determine behavior data of the user browsing the preset interface based on the operation information; and a second determining unit, configured to determine recommendation information for the user based on the behavior data, and displaying the recommendation information in the preset interface, wherein objects represented by the recommendation information comprise objects of a same category as a main object displayed in the preset interface, and objects of different categories from the main object.

In some embodiments, the behavior data comprises first behavior data representing that the user has a definite browsing object and second behavior data representing that the user has no definite browsing object; and the first determining unit is further configured to input, in response to determining that the operation information comprises a second preset operation, the operation information into a pre-trained behavior data recognition model to obtain a first array representing a first proportion of the first behavior data and a second proportion of the second behavior data.

In some embodiments, the first determining unit is further configured to determine, in response to determining that the operation information does not comprise the second preset operation, a portal to enter the preset interface; and determine, in response to determining that the portal is a portal in an interface obtained based on a third preset operation of the user, a second preset array representing the first proportion of the first behavior data and the second proportion of the second behavior data.

In some embodiments, the first determining unit is further configured to determine, in response to determining that the portal is a portal in a preset recommendation interface, a third preset array representing the first proportion of the first behavior data and the second proportion of the second behavior data.

In some embodiments, the second determining unit is further configured to determine the objects of the same category as the main object, based on the first proportion of the first behavior data and preset display area information in the preset interface; and determine the objects of different categories from the main object, based on the second proportion of the second behavior data and the preset display area information.

In some embodiments, the behavior data recognition model is obtained by training through a following method: a second acquiring unit, configured to acquire a training sample set, wherein training samples in the training sample set comprise: sample operation information with a unit of the preset length of time and sample labels; and a training unit, configured to train, using a machine learning algorithm, using the sample operation information in the training samples as input of an initial behavior data recognition model, and using the sample labels corresponding to the input sample operation information as expected output of an initial behavior data recognition model, to obtain the behavior data recognition model.

In some embodiments, the second acquiring unit is further configured to acquire log information; divide the log information according to a unit of the preset length of time to obtain a plurality of pieces of sample operation information; and determine, for each piece of sample operation information in the plurality of pieces of sample operation information, based on a number of object categories comprised in the sample operation information, and a number of page views for each category in the sample operation information, a sample label for the sample operation information.

Some embodiments of the present disclosure provide a computer readable storage medium storing computer instructions for causing a computer to perform the above method for recommending.

Some embodiments of the present disclosure provide an electronic device including at least one processor; and a memory in communication with the at least one processor; where the memory stores instructions executable by the at least one processor, the instructions being executed by the at least one processor to enable the at least one processor to perform the above method for recommending information.

BRIEF DESCRIPTION OF THE DRAWINGS

After reading detailed descriptions of non-limiting embodiments with reference to the following accompanying drawings, other features, objectives, and advantages of the present disclosure will become more apparent.

DETAILED DESCRIPTION OF EMBODIMENTS

The present disclosure will be further described in detail below with reference to the accompanying drawings and embodiments. It should be understood that the specific embodiments described herein are only used to explain the related disclosure, but not to limit the present disclosure. In addition, it should be noted that, for the convenience of description, only the parts related to the related disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
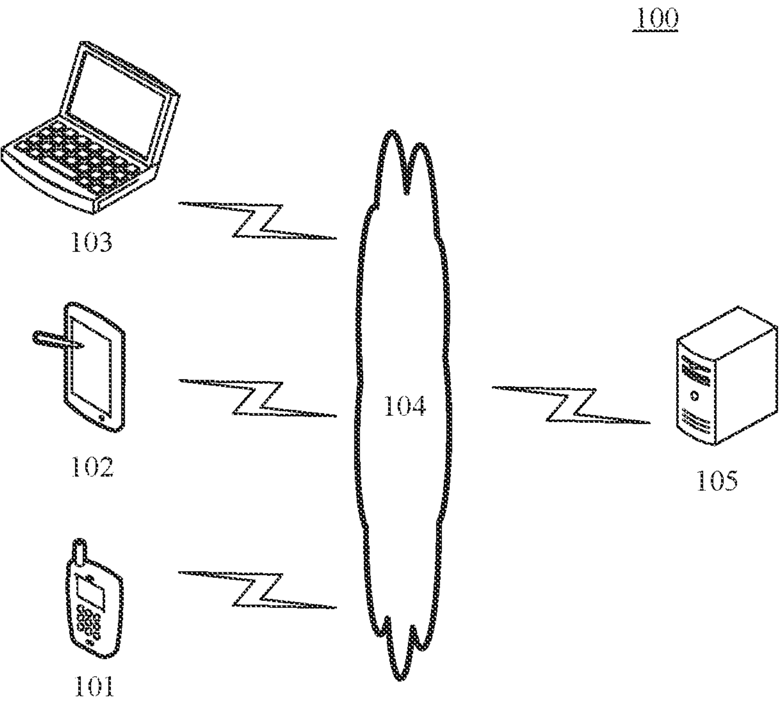
FIG. 1 is an exemplary system architecture diagram to which an embodiment of the present disclosure may be applied.

FIG. 1 illustrates an exemplary system architecture 100 to which a method for recommending information or an apparatus for recommending information of the present disclosure may be applied.

As shown in FIG. 1, the system architecture 100 may include terminal devices 101, 102, and 103, a network 104, and a server 105. The network 104 serves as a medium providing a communication link between the terminal devices 101, 102, 103, and the server 105. The network 104 may include various types of connections, such as wired or wireless communication links, or optical cables.

The terminal devices 101, 102, and 103 may be hardware devices or software that support network connection for data interaction and data processing. When the terminal devices 101, 102, 103 are hardware, they may be various electronic devices that support network connection, information interaction, display, processing and other functions, including but not limited to smart phones, tablet computers, e-book readers, laptops and desktop computers, etc. When the terminal devices 101, 102, and 103 are software, they may be installed in the electronic devices listed above. The terminal devices 101, 102, and 103 may be implemented, for example, as multiple software or software modules for providing distributed services, or as a single software or software module, which is not limited herein.

The server 105 may be a server that provides various services, for example, a backend processing server that performs information recommendation in response to determining that a user enters a preset interface based on a first preset operation on the terminal devices 101, 102, and 103. The backend processing server may acquire operation information within a preset length of time before the user performs a preset operation; determine behavior data of the user browsing the preset interface, based on the operation information; and determine recommendation information for the user, based on the behavior data, and display the recommendation information in the preset interface of the terminal devices. For example, the server 105 may be a cloud server.

It should be noted that the server may be hardware or software. When the server is hardware, it may be implemented as a distributed server cluster composed of multiple servers, or it may be implemented as a single server. When the server is software, it may be implemented as multiple software or software modules (e.g., software or software modules for providing distributed services), or it may be implemented as a single software or software module, which is not limited herein.

It should also be noted that the method for recommending information provided by embodiments of the present disclosure may be performed by the server, or by the terminal devices, or by the server and the terminal devices in cooperation with each other. Correspondingly, parts (e.g., units, sub-units, modules, sub-modules) included in the apparatus for recommending information may be all provided in the server, or may be all provided in the terminal devices, or may be provided in the server and the terminal devices respectively.

It should be understood that the numbers of terminal devices, networks, and servers in FIG. 1 are merely illustrative. Any number of terminal devices, networks, and servers may be provided according to implementation needs. When an electronic device on which the method for recommending information runs does not need to perform data transmission with other electronic devices, the system architecture may only include the electronic device on which the method for recommending information runs (e.g., the server or the terminal devices).

Figure 2:
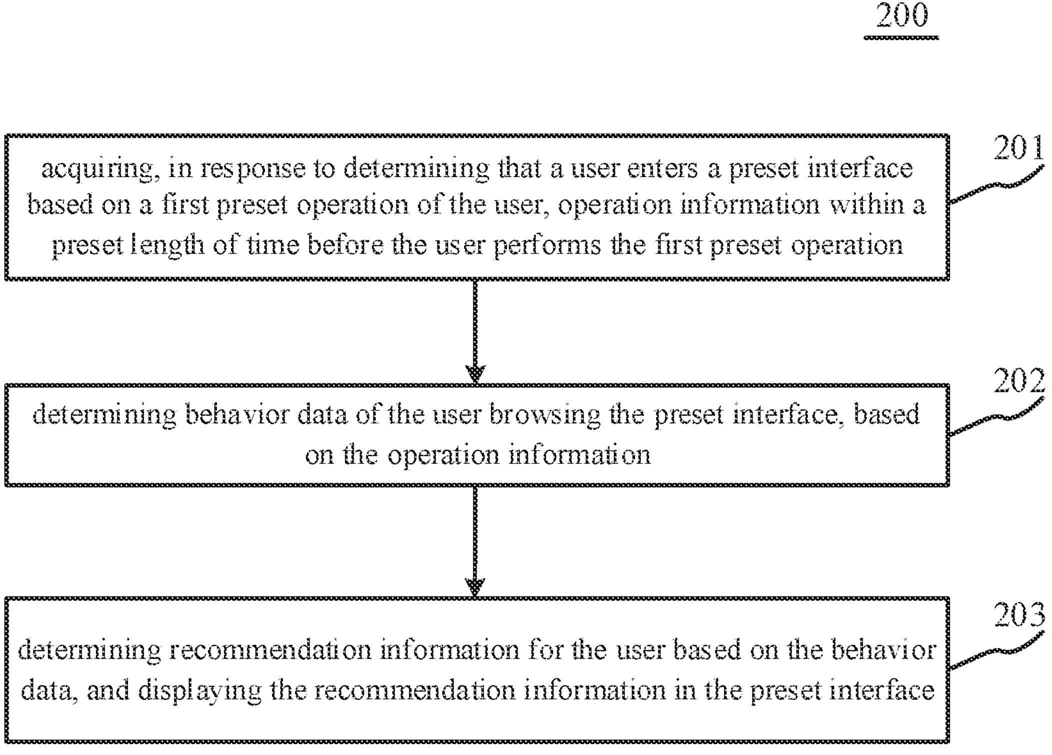
FIG. 2 is a flowchart of an embodiment of a method for recommending information according to the present disclosure.

With further reference to FIG. 2, illustrating a flow 200 of an embodiment of a method for recommending information, including the following step 201 to step 203.

Step 201, acquiring, in response to determining that a user enters a preset interface based on a first preset operation of the user, operation information within a preset length of time before the user performs the first preset operation.

In the present embodiment, an executing body of the method for recommending information (such as the terminal devices or server in FIG. 1) may, in response to determining that the user enters the preset interface based on the first preset operation of the user, acquire the operation information within the preset length of time before the user performs the preset operation remotely or locally through a wired connection or a wireless connection.

The user may be a user using a shopping application, and the user performs the first preset operation (e.g., a click operation, a search operation) to enter the preset interface during using the shopping application. The preset interface may be, for example, a goods details interface that mainly displays a main object. Using a certain model of mobile phone as an example, a corresponding preset interface includes pictures, videos, prices, configuration parameters and other information of the mobile phone of this model.

The operation information is operation information generated by using the shopping application within the preset length of time before the user performs the first preset operation, including but not limited to click operations, search operations, sliding operations, purchase operations, and communication operations with sellers. The preset length of time may be set according to an actual situation, for example, may be 30 minutes.

As an example, during the user using the shopping application, the executing body may acquire operation behavior of the user in real time and store the operation behavior to obtain corresponding operation information. As another example, the executing body may acquire the operation information from a log that records the operation information of the user using the shopping application.

Step 202, determining behavior data of the user browsing the preset interface, based on the operation information.

In the present embodiment, the executing body may determine the behavior data of the user browsing the preset interface, based on the operation information obtained in step 201.

The behavior data includes first behavior data representing that the user has a definite browsing object and second behavior data representing that the user has no definite browsing object. When the behavior data of the user is the first behavior data, it indicates that a purpose of the user entering the preset interface is clear, that is, for the main object displayed in the preset interface or objects of the same category as the main object. When the behavior data of the user is the second behavior data, it indicates that the purpose of the user entering the preset interface is not clear, not for the main object displayed in the preset interface or the objects of the same category as the main object, but intended to browse the interface at will.

In many cases, the user may not browse the preset interface purely based on the first behavior data or the second behavior data, but based on both of them, only proportions of the first behavior data representing that the user has a clear purpose and the second behavior data representing that the user does not have a clear purpose are different. In the present embodiment, the proportions of the first behavior data and the second behavior data of the user may be represented in a form of an array. For example, if the array representing the behavior data of the user is (0.7, 0.3), it indicates that the proportion of the first behavior data is 0.7, and the proportion of the second behavior data is 0.3.

For example, the executing body may determine an object category corresponding to each operation in all the operations based on all the operations in the operation information; and determine the behavior data of the user, based on the number of all object categories corresponding to the operation information and the number of page views by the user for each object category. Specifically, the fewer the number of all the object categories corresponding to the operation information and the more page views by the user for one of the object categories, the clearer the purpose of the user, the larger the proportion of the first behavior data and the smaller the proportion of the second behavior data. On the contrary, the larger the number of all the object categories corresponding to the operation information or the user has similar page views for each object category and there is no category with significantly more page views among others, the less clear the purpose of the user, the stronger the randomness, the smaller the proportion of the first behavior data, and the larger the proportion of the second behavior data.

The executing body may be provided with a correspondence table representing corresponding relationships each for the number of object categories, the number of page views for each object category and the array representing the behavior data of the user, to determine the behavior data of the user through the correspondence table.

In some alternative implementations of the present embodiment, the executing body performs the above step 202 by the following method:

First, inputting, in response to determining that the operation information includes a second preset operation, the operation information into a pre-trained behavior data recognition model to obtain a first array representing a first proportion of the first behavior data and a second proportion of the second behavior data.

The second preset operation is that a click operation, by the user, of selecting an object category or an object in the interface displayed by the shopping application. When the operation information includes the click operation, the executing body may input the operation information into the pre-trained behavior data recognition model to obtain the first array representing the first proportion of the first behavior data and the second proportion of the second behavior data. The behavior data recognition model represents a corresponding relationship between the operation information and the first array, and a neural network model having functions of feature extraction and information processing, such as a recurrent neural network model, may be used.

The behavior data recognition model is obtained by training through the following method: acquiring a training sample set, where training samples in the training sample set include: sample operation information and sample labels in the preset length of time, sample labels representing the behavior data of the user; and training, by using a machine learning algorithm, using the sample operation information in the training samples as input to an initial behavior data recognition model, and using the sample labels corresponding to the input sample operation information as expected output, to obtain the behavior data recognition model.

The training sample set is obtained by the following method: acquiring log information; dividing the log information according to the preset length of time to obtain a plurality of pieces of sample operation information; and determining, for each piece of sample operation information in the plurality of pieces of sample operation information, based on the number of object categories included in the sample operation information, and the number of page views for each category in the sample operation information, a sample label for the sample operation information.

Specifically, the fewer the number of all the object categories corresponding to the operation information, the more page views by the user for one of the object categories, the clearer the purpose of the user, the larger the proportion of the first behavior data, and the smaller the proportion of the second behavior data. On the contrary, the larger the number of all the object categories corresponding to the operation information, or the user has similar page views for each object category and there is no category with significantly more page views among others, it indicates that the less clear the purpose of the user, the stronger the randomness, the smaller the proportion of the first behavior data, and the larger the proportion of the second behavior data.

Secondly, determining, in response to determining that the operation information does not include the second preset operation, a portal to enter the preset interface.

Thirdly, determining, in response to determining that the portal is a portal in an interface obtained based on a third preset operation of the user, a second preset array representing the first proportion of the first behavior data and the second proportion of the second behavior data.

The third preset operation is a search operation performed by the user. If there is no click operation by the user in the operation information, and the portal for the user to enter the preset interface is the portal in the interface obtained based on the search operation performed by the user, the behavior data of the user may be represented by the second preset array. The first proportion of the first behavior data in the second preset array is much larger than the second proportion of the second behavior data. For example, the second preset array may be (1, 0).

Fourthly, determining, in response to determining that the portal is a portal in a preset recommendation interface, a third preset array representing the first proportion of the first behavior data and the second proportion of the second behavior data.

The preset recommendation interface is an interface for recommending objects to the user based on user interests. For example, a homepage of the shopping application generally has a "guess what you like" display area, in this display area, there are displayed goods of interest recommended to the user, and the homepage may be used as the preset recommendation interface.

If the operation information does not include the second preset operation, and the portal to enter the preset interface is the portal in the preset recommendation interface, the behavior data of the user may be represented by the third preset array. In the third preset array, the first proportion of the first behavior data is equal to the second proportion of the second behavior data. For example, the third preset array may be (0.5, 0.5).

The practicability and accuracy of the present embodiment may be improved through the above distinction for different situations and by determining the behavior data of the user in different methods.

Step 203, determining recommendation information for the user based on the behavior data, and displaying the recommendation information in the preset interface.

In the present embodiment, the executing body may determine the recommendation information for the user based on the behavior data determined in step 202, and display the recommendation information in the preset interface. Objects represented by the recommendation information include objects of the same category as the main object displayed in the preset interface, and objects of different categories from the main object.

In the preset interface, information such as pictures, videos, prices, etc. of the main object is generally displayed through a majority of a display area, and there are other preset display areas other than the display area of the main object. In the preset display areas, the objects of the same category as the main object and the objects of different categories from the main object may be displayed.

In some alternative implementations of the present embodiment, the executing body determining the objects of the same category as the main object, based on the first proportion of the first behavior data and preset display area information in the preset interface; and determining the objects of different categories from the main object, based on the second proportion of the second behavior data and the preset display area information.

For example, the first proportion of the first behavior data of the user is 0.7, the second proportion of the second behavior data is 0.3, and the number of preset display areas is 10, then in the 10 preset display areas, 7 (0.7*10) preset display areas display the objects of the same category as the main object, and 3 (0.3*10) preset display areas display the objects of different categories from the main object.

Figure 3:
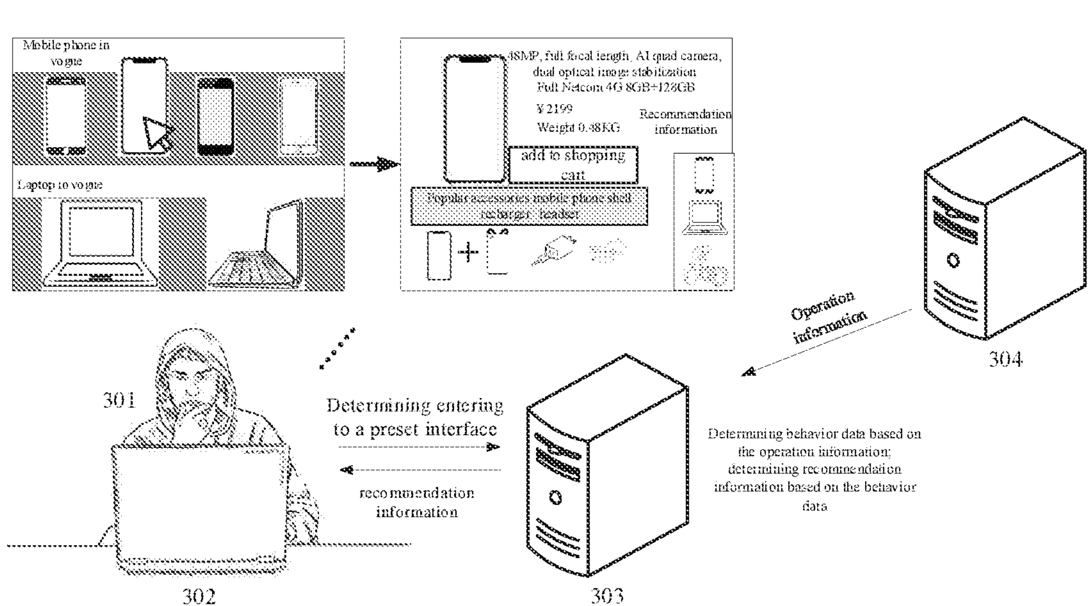
FIG. 3 is a schematic diagram of an application scenario of the method for recommending information according to the present embodiment.

With further reference to FIG. 3, FIG. 3 is a schematic diagram of an application scenario of the method for recommending information according to the present embodiment. In the application scenario of FIG. 3, a user 301 browses a shopping application through a terminal device 302. During browsing, the user 301 clicks on a portal to a goods details interface (preset interface) with a mobile phone of a certain model as a main object on the homepage. A server 303 detects the operation of the user 301, and determines that the user 301 is about to enter the goods details interface of the mobile phone. In response to determining that the user 301 enters the goods details interface, the server 303 acquires, from a database 304, operation information within a preset length of time before the user 301 performs the click operation; based on the operation information, determines behavior data of the user 301 browsing the preset interface, where the behavior data includes first behavior data representing that the user has a definite browsing object, a proportion of which is 0.7, and second behavior data representing that the user has no definite browsing object, a proportion of which is 0.3. Further, the server 303 determines recommendation information for the user 301 based on the determined behavior data, and displays the recommendation information in the preset interface, where objects represented by the recommendation information include objects of the same category as the main object displayed in the preset interface (other models of mobile phones), objects of different categories from the main object (including laptops, digital cameras).

In the method provided by the above embodiment of the present disclosure, by acquiring, in response to determining that a user enters a preset interface based on a first preset operation of the user, operation information within a preset length of time before the user performs the first preset operation; determining behavior data of the user browsing the preset interface, based on the operation information; and determining recommendation information for the user, based on the behavior data, and displaying the recommendation information in the preset interface, where objects represented by the recommendation information include objects of the same category as a main object displayed in the preset interface, and objects of different categories from the main object, independent restrictions between a recommendation scenario of a goods details interface and an information flow scenario are overcome. In the preset interface, the objects of the same category as the main object corresponding to the recommendation scenario of the goods details interface may be displayed, and the objects of different categories from the main object corresponding to the information flow scenario may also be displayed, which reduces the number of times the user switches the interface back and forth during use, and improves the user stickiness.

Figure 4:
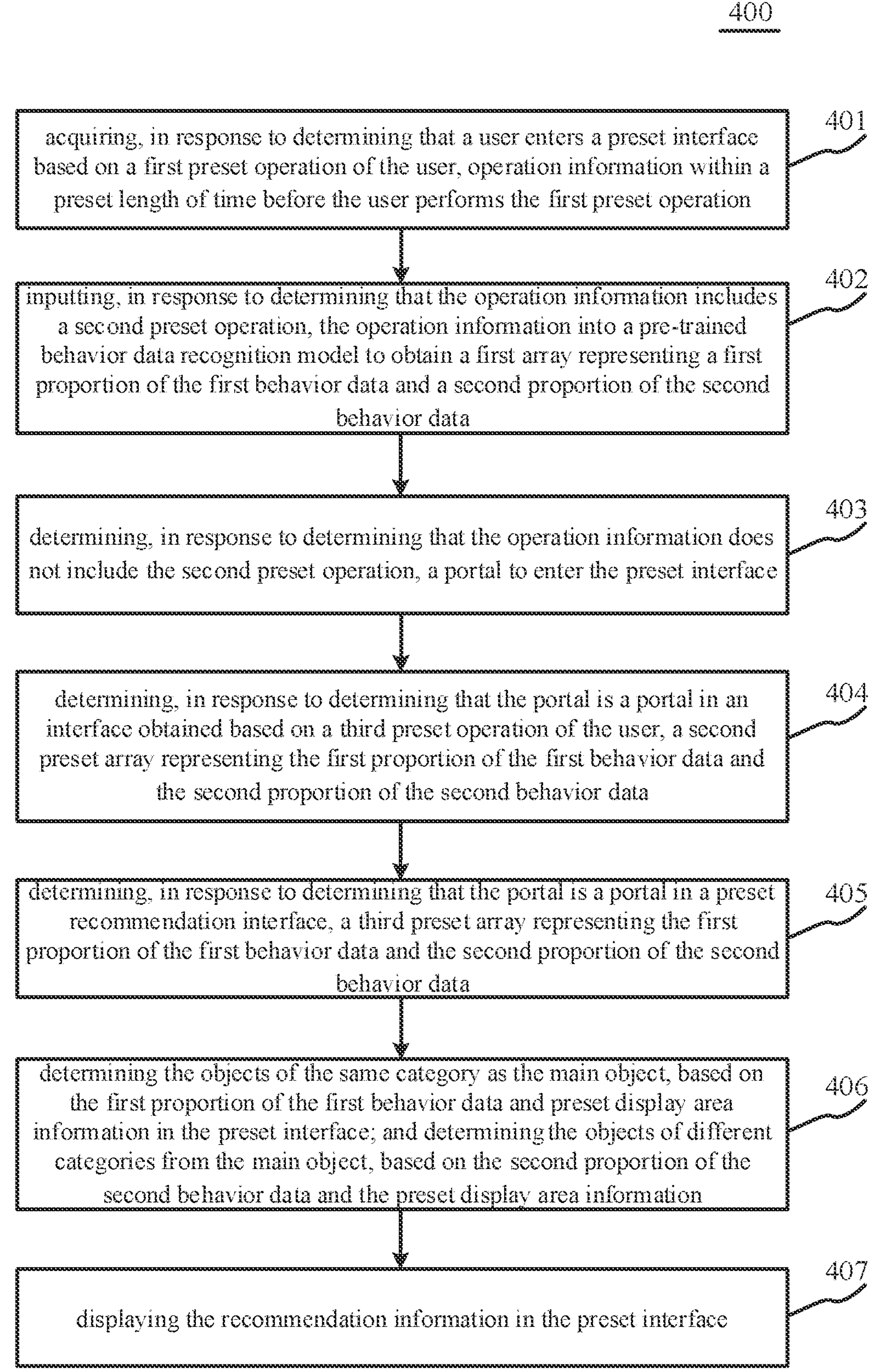
FIG. 4 is a flowchart of another embodiment of the method for recommending information according to the present disclosure.

With further reference to FIG. 4, illustrating a schematic flow 400 of another embodiment of the method for recommending information according to the present disclosure, including the following step 401 to step 407.

Step 401, acquiring, in response to determining that a user enters a preset interface based on a first preset operation of the user, operation information within a preset length of time before the user performs the first preset operation.

Step 402, inputting, in response to determining that the operation information includes a second preset operation, the operation information into a pre-trained behavior data recognition model to obtain a first array representing a first proportion of the first behavior data and a second proportion of the second behavior data.

Step 403, determining, in response to determining that the operation information does not include the second preset operation, a portal to enter the preset interface.

Step 404, determining, in response to determining that the portal is a portal in an interface obtained based on a third preset operation of the user, a second preset array representing the first proportion of the first behavior data and the second proportion of the second behavior data.

Step 405, determining, in response to determining that the portal is a portal in a preset recommendation interface, a third preset array representing the first proportion of the first behavior data and the second proportion of the second behavior data.

Step 406, determining the objects of the same category as the main object, based on the first proportion of the first behavior data and preset display area information in the preset interface; and determining the objects of different categories from the main object, based on the second proportion of the second behavior data and the preset display area information.

Step 407, displaying the recommendation information in the preset interface.

It can be seen from the present embodiment that, compared with the embodiment corresponding to FIG. 2, the flow 400 of the method for recommending information in the present embodiment describes in detail determining the behavior data of the user in different methods according to different scenarios. In this way, the accuracy of information recommendation in the present embodiment is improved.

Figure 5:
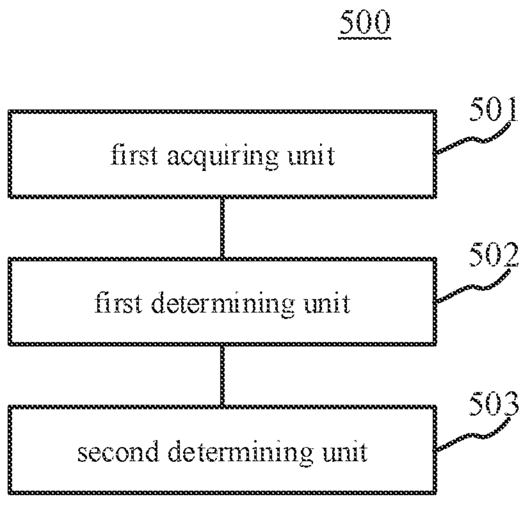
FIG. 5 is a structural diagram of an embodiment of an apparatus for recommending information according to the present disclosure.

With further reference to FIG. 5, as an implementation of the method shown in the above Figures, the present disclosure provides an embodiment of an apparatus for recommending information. The embodiment of the apparatus corresponds to the embodiment of the method shown in FIG. 2. The apparatus may be applied to various electronic devices.

As shown in FIG. 5, the apparatus for recommending information includes: a first acquiring unit 501, configure to acquire, in response to determining that a user enters a preset interface based on a first preset operation of the user, operation information within a preset length of time before the user performs the first preset operation; a first determining unit 502, configured to determine behavior data of the user browsing the preset interface based on the operation information; and a second determining unit 503, configured to determine recommendation information for the user based on the behavior data, and displaying the recommendation information in the preset interface, wherein objects represented by the recommendation information comprise objects of a same category as a main object displayed in the preset interface, and objects of different categories from the main object.

In some embodiments, the behavior data includes first behavior data representing that the user has a definite browsing object and second behavior data representing that the user has no definite browsing object; and the first determining unit 502 is further configured to input, in response to determining that the operation information includes a second preset operation, the operation information into a pre-trained behavior data recognition model to obtain a first array representing a first proportion of the first behavior data and a second proportion of the second behavior data.

In some embodiments, the first determining unit 502 is further configured to determine, in response to determining that the operation information does not comprise the second preset operation, a portal to enter the preset interface; and determine, in response to determining that the portal is a portal in an interface obtained based on a third preset operation of the user, a second preset array representing the first proportion of the first behavior data and the second proportion of the second behavior data.

In some embodiments, the first determining unit 502 is further configured to determine, in response to determining that the portal is a portal in a preset recommendation interface, a third preset array representing the first proportion of the first behavior data and the second proportion of the second behavior data.

In some embodiments, the second determining unit 503 is further configured to determine the objects of the same category as the main object, based on the first proportion of the first behavior data and preset display area information in the preset interface; and determine the objects of different categories from the main object, based on the second proportion of the second behavior data and the preset display area information.

In some embodiments, the behavior data recognition model is obtained by training by a following method: a second acquiring unit (not shown in the figure), configured to acquire a training sample set, wherein training samples in the training sample set comprise: sample operation information with a unit of the preset length of time and sample labels; and a training unit (not shown in the figure), configured to train, using a machine learning algorithm, using the sample operation information in the training samples as input of an initial behavior data recognition model, and using the sample labels corresponding to the input sample operation information as expected output of an initial behavior data recognition model, to obtain the behavior data recognition model.

In some embodiments, the second acquiring unit is further configured to acquire log information; divide the log information according to a unit of the preset length of time to obtain a plurality of pieces of sample operation information; and determine, for each piece of sample operation information in the plurality of pieces of sample operation information, based on a number of object categories comprised in the sample operation information, and a number of page views for each category in the sample operation information, a sample label for the sample operation information.

In the present embodiment, the first acquiring unit in the apparatus for recommending information acquires, in response to determining that the user enters a preset interface based on a first preset operation of a user, operation information within a preset length of time before the user performs the first preset operation; the first determining unit determines behavior data of the user browsing the preset interface, based on the operation information; and the second determining unit determines recommendation information for the user, based on the behavior data, and display the recommendation information in the preset interface, where objects represented by the recommendation information include objects of the same category as a main object displayed in the preset interface, and objects of different categories from the main object, thereby overcoming independent restrictions between a recommendation scenario of a goods details interface and an information flow scenario. In the preset interface, the objects of the same category as the main object corresponding to the recommendation scenario of the goods details interface may be displayed, and the objects of different categories from the main object corresponding to the information flow scenario may also be displayed, which reduces the number of times the user switches the interface back and forth during use, and improves user stickiness.

Figure 6:
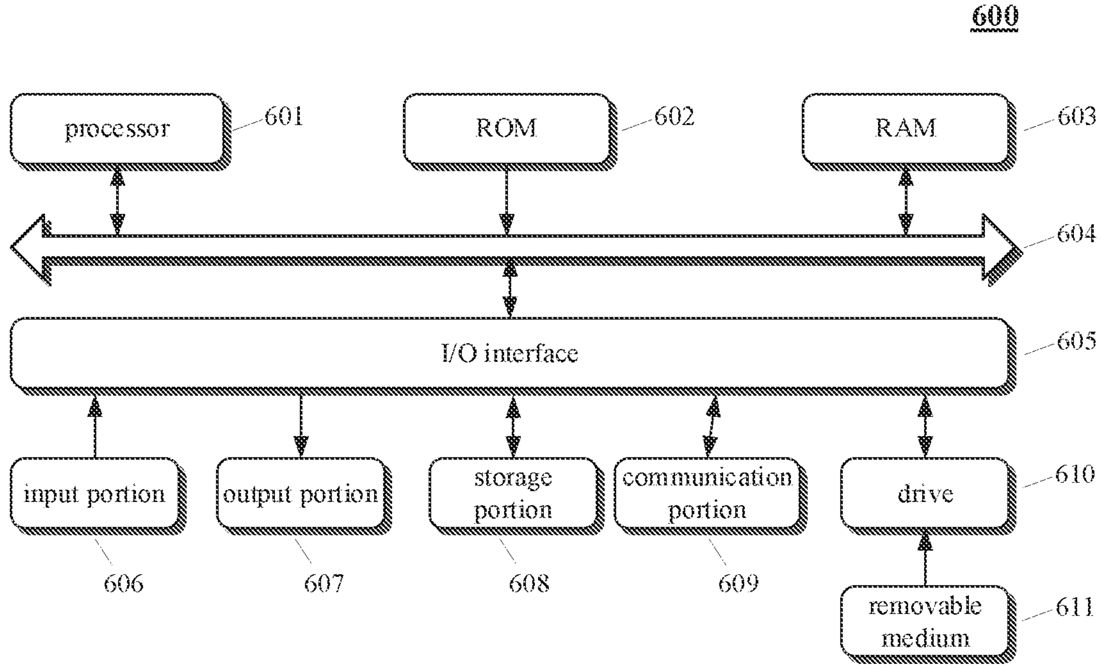
FIG. 6 is a schematic structural diagram of a computer system suitable for implementing embodiments of the present disclosure.

With further reference to FIG. 6, a schematic structural diagram of a computer system 600 suitable for implementing devices (for example, the devices 101, 102, 103, 105 as shown in FIG. 1) of the embodiments of the present disclosure is shown. The devices shown in FIG. 6 is merely an example, and should not impose any limitation on the function and scope of use of the embodiments of the present disclosure.

As shown in FIG. 6, the computer system 600 includes a processor (e.g., CPU, central processing unit) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The processor 601, the ROM 602 and the RAM 603 are connected to each other through a bus 604. An input/output (I/O) interface 605 is also connected to the bus 604.

The following components may be connected to the I/O interface 605: an input portion 606 including a keyboard, a mouse, or the like; an output portion 607 including such as a cathode ray tube (CRT), or a liquid crystal display (LCD), and a speaker, etc.; the storage portion 608 including a hard disk or the like; and a communication portion 609 including a network interface card such as a LAN card, or a modem. The communication portion 609 performs communication processing via a network such as the Internet. A drive 610 is also connected to the I/O interface 605 as needed. A removable medium 611, such as a magnetic disk, an optical disk, a magneto-optical disk, or a semiconductor memory, is mounted on the drive 610 as needed so that a computer program read therefrom is installed into the storage portion 608 as needed.

In particular, according to embodiments of the present disclosure, the processes described above with reference to the flowcharts may be implemented as computer software programs. For example, the embodiments of the present disclosure include a computer program product comprising a computer program carried on a computer readable medium, the computer program containing program codes for performing the method illustrated in the flowcharts. In such embodiments, the computer program may be downloaded and installed from the network via the communication portion 609 and/or installed from the removable medium 611. When the computer program is executed by the processor 601, the above functions defined in the method of the present disclosure are performed.

It should be noted that the computer readable medium described by some embodiments of the present disclosure may be computer readable signal medium or computer readable storage medium or any combination of the above two. The computer readable storage medium may be, but is not limited to: an electric, magnetic, optical, electromagnetic, infrared, or semiconductor system, an apparatus, an element, or any combination of the above. A more specific example of the computer readable storage medium may include but is not limited to: an electrical connection with one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by or in combination with an instruction execution system, an apparatus or an element. In some embodiments of the present disclosure, the computer readable signal medium may include a data signal in the base band or propagating as a part of a carrier, in which computer readable program codes are carried. The propagating signal may be various forms, including but not limited to: an electromagnetic signal, an optical signal or any suitable combination of the above. The computer readable signal medium may be any computer readable medium except for the computer readable storage medium. The computer readable signal medium is capable of transmitting, propagating or transferring programs for use by or in combination with an instruction execution system, an apparatus or an element. The program codes contained on the computer readable medium may be transmitted with any suitable medium including but not limited to: a wire, an optical cable, RF (Radio Frequency), or any suitable combination of the above.

A computer program code for executing operations of some embodiments of the present disclosure may be written in one or more programming languages or a combination thereof. The programming languages include object-oriented programming languages, such as Java, Smalltalk or C++, and also include conventional procedural programming languages, such as "C" language or similar programming languages. The program code may be completely executed on a user computer, partially executed on a user computer, executed as a separate software package, partially executed on a user computer and partially executed on a remote computer, or completely executed on a remote computer or server. In a case involving a remote computer, the remote computer may be connected to a user computer through any kind of network, including a local area network (LAN) or a wide area network (WAN), or may be connected to an external computer (for example, connected through Internet using an Internet service provider).

The flowcharts and block diagrams in the accompanying drawings show architectures, functions and operations that may be implemented according to the systems, methods and computer program products of the various embodiments of the present disclosure. In this regard, each of the blocks in the flowcharts or block diagrams may represent a module, a program segment, or a code portion, the module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks in the block diagrams and/or flowcharts may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, may be described as: a processor, including a first acquiring unit, a first determining unit and a second determining unit. Here, the names of these units do not in some cases constitute limitations to such units themselves. For example, the first determining unit may also be described as "a unit configured to determine behavior data of the user browsing the preset interface, based on the operation information".

As another aspect, the present disclosure also provides a computer readable medium. The computer readable medium may be included in the device described in the above embodiments, or a stand-alone computer readable medium not assembled into the device. The computer readable medium carries one or more programs, the one or more programs, when executed by the apparatus, cause the apparatus to: acquire, in response to determining that a user enters a preset interface based on a first preset operation of a user, operation information within a preset length of time before the user performs the first preset operation; determine behavior data of the user browsing the preset interface, based on the operation information; and determine recommendation information for the user, based on the behavior data, and display the recommendation information in the preset interface, where objects represented by the recommendation information include objects of the same category as a main object displayed in the preset interface, and objects of different categories from the main object.

The above description only provides an explanation of the preferred embodiments of the present disclosure and the technical principles used. It should be appreciated by those skilled in the art that the inventive scope involved in the present disclosure is not limited to the technical solutions formed by the particular combinations of the above technical features. The inventive scope should also cover other technical solutions formed by any combinations of the above technical features or equivalent features thereof without departing from the concept of the present disclosure, such as technical solutions formed through the above features and technical features having similar functions provided (or not provided) in the present disclosure being replaced with each other.

What is claimed is:

1. A computer-implemented method of allocating resources in a graphical user interface (GUI) of an e-commerce application on a display device to reduce user interface switching events, the method comprising:

receiving, from the display device, a first preset operation of the user, wherein the first preset operation comprises selecting, via a click operation, an interactive interface element;

acquiring, in response to determining that a user enters a preset interface from a homepage of a shopping application based on receiving the first preset operation of the user, operation information within a preset length of time before the user performs the first preset operation, wherein the preset interface comprises a goods details interface configured to display a main object and further comprises a preset display area having a plurality of preset display regions, each of the preset display regions displaying an object other than the main object, and wherein the homepage displays a plurality of interactive interface elements corresponding to objects of different categories from the main object;

determining behavior data of the user based on the operation information, comprising:

receiving, via a click operation, a second preset operation comprising selection of an object category or a selectable object displayed in the preset interface;

inputting, in response to determining that the operation information comprises the second preset operation, the operation information into a pre-trained behavior data recognition model comprising a neural network, wherein the pre-trained behavior data recognition model is configured to: receive the operation information, classify a user behavior in the operation information according to learning from training, and output a first array of only two elements;

outputting the first array of only two elements, wherein one of the two elements is a first proportion which represents a proportion of a first behavior and the other of the two elements is a second proportion which represents a proportion of a second behavior, wherein the first proportion and the second proportion sum to unity, and wherein in the first array, the first proportion and the second proportion are not preset; and determining, in response to determining that the operation information does not comprise the second preset operation, a portal to enter the preset interface and generating a second array of two elements in response to determining that the portal is a portal in a search results interface obtained based on a third preset operation of the user, wherein the third preset operation of the user comprises inputting a search operation into the homepage;

wherein the two elements comprise a third proportion which represents the proportion of the first behavior and a fourth proportion which represents the proportion of the second behavior, wherein the third proportion and the fourth proportion sum to unity, wherein, in the second array, the third proportion and the fourth proportion are preset;

wherein the first behavior represents that the user has a definite browsing object and the second behavior represents that the user has no definite browsing object; and determining recommendation information for the user based on the behavior data, and displaying the recommendation information in the preset interface, wherein objects represented by the recommendation information comprise objects of a same category as the main object displayed in the preset interface, and one or more objects of different categories from the main object, wherein the one or more objects of the different categories from the main object are associated with one or more of the plurality of interactive interface elements, wherein the determining the recommendation information for the user based on the behavior data comprises:

allocating, based on a total number of the preset display regions in the preset display area in the preset interface and in proportion to one of the first proportion or the third proportion of the first behavior, a corresponding first number of the preset display regions in the preset display area that display a number of the objects of the same category as the main object, and allocating, based on the total number of preset display regions in the preset display area in the preset interface and in proportion to one of the second proportion or the fourth proportion of the second behavior, a corresponding second number of the preset display regions in the preset display area that display a number of the objects of the different categories from the main object; and outputting instructions to the display device to cause the display device to render the number of the objects of the same category as the main object in the allocated first number of the preset display regions, and the number of the objects of the different categories from the main object in the allocated second number of the preset display regions, such that the objects of the same category as the main object and the objects of the different categories from the main object are displayed at the same time in the allocated first number of the preset display regions and the allocated second number of the preset display regions.

2. The computer-implemented method according to claim 1, wherein the determining behavior data of the user browsing the preset interface based on the operation information, further comprises:

determining, in response to determining that the portal is a portal in a preset recommendation interface, a third preset array representing a fifth proportion of the first behavior and a sixth proportion of the second behavior.

3. The computer-implemented method according to claim 1, wherein the pre-trained behavior data recognition model is obtained by training through a following method:

acquiring a training sample set, wherein training samples in the training sample set comprise: sample operation information with a unit of the preset length of time and sample labels; and training, using a machine learning algorithm, using the sample operation information in the training samples as input of an initial behavior data recognition model, and using the sample labels corresponding to the input sample operation information as expected output of the initial behavior data recognition model, to obtain the pre-trained behavior data recognition model.

4. The computer-implemented method according to claim 3, wherein the acquiring a training sample set, comprises:

acquiring log information;

dividing the log information according to a unit of the preset length of time to obtain a plurality of pieces of sample operation information; and determining, for each piece of sample operation information in the plurality of pieces of sample operation information, based on a number of object categories comprised in the sample operation information, and a number of page views for each category in the sample operation information, a sample label for the sample operation information.

5. An apparatus configured for allocating resources in a graphical user interface (GUI) of an e-commerce application on a display device to reduce user interface switching events, the apparatus comprising:

at least one processor; and a memory storing:

a pre-trained behavior data recognition model based on a neural network which was trained using data which represents a relationship between operation information and categories of user behavior, and is configured to output a data structure comprising a first array, wherein each element of the first array represents a corresponding output value of the pre-trained behavior data recognition model for a respective one of a plurality of predefined behavior categories for which the model was trained, in response to being input with operation information which represents user behavior, and instructions that, when executed by the at least one processor, cause the at least one processor to perform operations, the operations comprising:

receiving, from the display device, a first preset operation of the user, wherein the first preset operation comprises selecting, via a click operation, an interactive interface element;

acquiring, in response to determining that a user enters a preset interface from a homepage of a shopping application based on receiving the first preset operation of the user, operation information within a preset length of time before the user performs the first preset operation, wherein the preset interface comprises a goods details interface configured to display a main object and further comprises a preset display area having a plurality of preset display regions, each of the preset display regions displaying an object other than the main object, and wherein the homepage displays a plurality of interactive interface elements corresponding to objects of different categories from the main object;

determining behavior data of the user based on the operation information comprising:

parsing data in the operation information to determine whether the operation information comprises a second preset operation or does not comprise the second preset operation, and outputting a corresponding determination result, in response to receiving, via a click operation, a second preset operation comprising selection of an object category or a selectable object displayed in the preset interface and determining that the operation information does comprise the second preset operation, inputting the operation information into the pre-trained behavior data recognition model and classifying the operation information into a first behavior and a second behavior and outputting the data structure comprising the first array of only two elements, wherein one of the two elements is a first proportion which represents a proportion of a first behavior and the other of the two elements is a second proportion which represents a proportion of a second behavior wherein the first proportion and second proportion sum to unity and wherein, in the first array, the first proportion and the second proportion are not preset, and in response to determining that the operation information does not comprise the second preset operation, further parsing the data in the operation information to verify that a portal used to enter the preset interface is a portal in search results interface obtained based on a third preset operation of the user, wherein the third preset operation of the user comprises inputting a search operation into the homepage, and generating a second array of only two elements, wherein the two elements comprise a third proportion which represents the proportion of the first behavior and a fourth proportion which represents the proportion of the second behavior, wherein the third proportion and the fourth proportion sum to unity, wherein in the second array, the third proportion and the fourth proportion are preset values, wherein the first behavior represents that the user has a definite browsing object and the second behavior represents that the user has no definite browsing object;

determining recommendation information for the user based on the behavior data, and displaying the recommendation information in the preset interface, wherein objects represented by the recommendation information comprise objects of a same category as the main object displayed in the preset interface, and one or more objects of different categories from the main object, wherein the one or more objects of the different categories from the main object are associated with one or more of the plurality of interactive interface elements, wherein the determining recommendation information for the user based on the behavior data comprises:

allocating, based on a total number of the preset display regions in the preset display area in the preset interface and in proportion to one of the first proportion or the third proportion of the first behavior, a corresponding first number of the preset display regions in the preset display area that display a number of the objects of the same category as the main object, and allocating, based on the total number of preset display regions in the preset display area in the preset interface and in proportion to one of the second proportion or the fourth proportion of the second behavior, a corresponding second number of the preset display regions in the preset display area that display a number of the objects of the different categories from the main object; and outputting instructions to the display device to cause the display device to render the number of the objects of the same category as the main object in the allocated first number of the preset display regions, and the number of the objects of the different categories from the main object in the allocated second number of the preset display regions, such that the objects of the same category as the main object and the objects of the different categories from the main object are displayed at the same time in the allocated first number of the preset display regions and the allocated second number of the preset display regions, wherein the operations further comprise training the pre-trained behavior data recognition model on historical operation data comprising a training sample set, and using labels as a target metric to thereby obtain the pre-trained data behavior recognition model, such that, via the training, the pre-trained data behavior recognition model is configured to internally perform classification into the first behavior and the second behavior in response to input of the operation information, and then output corresponding values as a first element and a second element which express the proportions of the first behavior and the second behavior, and wherein the training the pre-trained behavior data recognition model further comprises acquiring the training sample set and acquiring the labels comprises acquiring log information, dividing the acquired log information according to a unit of the preset length of time to obtain a plurality of pieces of sample operation information, and obtaining, for each piece of sample operation information in the plurality of pieces of sample operation information, based on a number of object categories comprised in the sample operation information, and a number of page views for each category in the sample operation information, a sample label for the sample operation information.

6. The apparatus according to claim 5, wherein determining the behavior data of the user based on the operation information further comprises determining, in response to determining that the portal is a portal in a preset recommendation interface, a third preset array representing a fifth proportion of the first behavior and a sixth proportion of the second behavior.

7. The apparatus according to claim 5, wherein the pre-trained behavior data recognition model is obtained by training through a following method:

acquiring the training sample set, wherein training samples in the training sample set comprise: sample operation information with the unit of the preset length of time and sample labels; and training, using a machine learning algorithm, using the sample operation information in the training samples as input of an initial behavior data recognition model, and using the sample labels corresponding to the input sample operation information as expected output of the initial behavior data recognition model, to obtain the pre-trained behavior data recognition model.

8. A non-transitory computer readable medium, storing a computer program thereon, wherein, the computer program, when executed by a processor, implements operations of allocating resources in a graphical user interface (GUI) of an e-commerce application on a display device to reduce user interface switching events, the operations comprising:

receiving, from the display device, a first preset operation of the user, wherein the first preset operation comprises selecting, via a click operation, an interactive interface element;

acquiring, in response to determining that a user enters a preset interface from a homepage of a shopping application based on receiving the first preset operation of the user, operation information within a preset length of time before the user performs the first preset operation, wherein the preset interface comprises a goods details interface configured to display a main object and further comprises a preset display area having a plurality of preset display regions, each of the preset display regions displaying an object other than the main object, and wherein the homepage displays a plurality of interactive interface elements corresponding to objects of different categories from the main object;

determining behavior data of the user based on the operation information, comprising:

inputting, in response to receiving, via a click operation, a second preset operation comprising selection of an object category or a selectable object displayed in the preset interface and determining that the operation information comprises a second preset operation, the operation information into a pre-trained behavior data recognition model comprising a neural network, wherein the pre-trained behavior data recognition model is configured to: receive the operation information, classify a user behavior in the operation information according to learning from training, and output a first array of only two elements;

outputting the first array of two elements, wherein one of the two elements is a first proportion which represents a proportion of a first behavior and the other of the two elements is a second proportion which represents a proportion of a second behavior, wherein the first proportion and second proportion sum to unity, wherein in the first array, the first proportion and the second proportion are not preset, wherein the pre-trained behavior data recognition model was trained on historical user operation data and used labels as a target metric to train the behavior data recognition model and thereby obtain the pre-trained data behavior recognition model, such that the pre-trained data behavior recognition model is configured to internally perform classification into the first behavior and the second behavior in response to being input with the operation information, determining, in response to determining that the operation information does not comprise the second preset operation, a portal to enter the preset interface and generating a second array of two elements, in response to determining that the portal is a portal in a search results interface obtained based on a third preset operation of the user, wherein the third preset operation of the user comprises inputting a search operation into the homepage, and wherein the two elements comprise a third proportion which represents the proportion of the first behavior and a fourth proportion which represents the proportion of the second behavior, wherein the third proportion and the fourth proportion sum to unity, wherein, in the second array, the third proportion and the fourth proportion are preset, wherein the first behavior represents that the user has a definite browsing object and the second behavior representing represents that the user has no definite browsing object;

determining recommendation information for the user based on the behavior data, and displaying the recommendation information in the preset interface, wherein objects represented by the recommendation information comprise objects of a same category as the main object displayed in the preset interface, and one or more objects of different categories from the main object, wherein the one or more objects of the different categories from the main object are associated with one or more of the plurality of interactive interface elements, wherein the determining the recommendation information for the user based on the behavior data comprises:

allocating, based on a total number of the preset display regions in a preset display area in the preset interface and in proportion to one of the first proportion or the third proportion of the first behavior, a corresponding second number of the preset display regions in the preset display area that display a number of the objects of the same category as the main object; and allocating, based on the total number of preset display regions in the preset display area in the preset interface and in proportion to one of the second proportion or the fourth proportion of the second behavior, a corresponding second number of the preset display regions in the preset display area that display a number of the objects of the different categories from the main object; and outputting instructions to the display device to cause the display device to render the number of the objects of the same category as the main object in the allocated first number of the preset display regions, and the number of the objects of the different categories from the main object in the allocated second number of the preset display regions, such that the objects of the same category as the main object and the objects of the different categories from the main object are displayed at the same time in the allocated first number of the preset display regions and the allocated second number of the preset display regions.

9. The non-transitory computer readable medium according to claim 8, wherein determining the behavior data of the user browsing the preset interface based on the operation information further comprises:

determining, in response to determining that the portal is a portal in a preset recommendation interface, a third preset array representing a fifth proportion of the first behavior and a sixth proportion of the second behavior.

10. The non-transitory computer readable medium according to claim 8, wherein the pre-trained behavior data recognition model is obtained by training through a following method:

acquiring a training sample set, wherein training samples in the training sample set comprise: sample operation information with a unit of the preset length of time and sample labels; and training, using a machine learning algorithm, using the sample operation information in the training samples as input of an initial behavior data recognition model, and using the sample labels corresponding to the input sample operation information as expected output of an initial behavior data recognition model, to obtain the pre-trained behavior data recognition model.

11. The computer-implemented method according to claim 1, wherein:

the total number of preset display regions in the preset display area comprises a total number of preset areas configured for displaying objects of the same category as the main object and objects of a different category from the main object which are available for use, and in the second array, the third proportion of the first behavior is equal to the the fourth proportion of the second behavior.

12. The method according to claim 1, wherein the allocating, based on the total number of the preset display regions in the preset display area in the preset interface and in proportion to one of the first proportion or the third proportion of the first behavior, the corresponding first number of the preset display regions in the preset display area for displaying the number of the objects of the same category as the main object, comprises:

generating the first number by multiplying the total number of the preset display regions by the first proportion or the third proportion, wherein the first number is a number of the preset display regions to be allocated for displaying one or more objects of the same category as the main object, and the allocating, based on the total number of the preset display regions in the preset display area in the preset interface and in proportion to one of the second proportion or the fourth proportion of the second behavior, the corresponding second number of the preset display regions in the preset display area for displaying the number of the objects of the different categories from the main object, comprises: generating the second number by multiplying the total number of the preset display regions by the second proportion, wherein the corresponding second number is a number of the preset display regions allocated for displaying the one or more objects of the different categories from the main object.

13. The non-transitory computer readable medium according to claim 8, wherein the allocating, based on the total number of the preset display regions in the preset display area in the preset interface and in proportion to one of the first proportion or the third proportion of the first behavior, the corresponding first number of the preset display regions in the preset display area for displaying the number of the objects of the same category as the main object, comprises:

generating the first number by multiplying the total number of the preset display regions by the first proportion, wherein the first number is a number of the preset display regions to be allocated for displaying one or more objects of the same category as the main object, and the allocating, based on the total number of the preset display regions in the preset display area in the preset interface and in proportion to one of the second proportion or the fourth proportion of the second behavior, the corresponding second number of the preset display regions in the preset display area for displaying the number of the objects of the different categories from the main object, comprises: generating the second number by multiplying the total number of the preset display regions by the second proportion, wherein the corresponding second number is a number of the preset display regions allocated for displaying the one or more objects of the different categories from the main object.

* * * * *